(12) United States Patent
Chiang

(10) Patent No.: US 7,991,278 B2
(45) Date of Patent: Aug. 2, 2011

(54) CAMERA MODULE WITH ANTI-SHAKE MECHANISM

(75) Inventor: Shun-Fan Chiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/755,417

(22) Filed: Apr. 7, 2010

(65) Prior Publication Data
US 2011/0013895 A1 Jan. 20, 2011

(30) Foreign Application Priority Data

Jul. 17, 2009 (CN) .......................... 2009 1 0304492

(51) Int. Cl.
*G03B 17/00* (2006.01)
*H04N 5/228* (2006.01)
*G02B 27/46* (2006.01)
(52) U.S. Cl. ...................... 396/55; 348/208.11; 359/557
(58) Field of Classification Search .................... 396/55, 396/52; 348/208.99, 208.2, 208.4, 208.7, 348/208.11; 359/554–557
See application file for complete search history.

(56) References Cited

U.S. PATENT DOCUMENTS
2008/0198462 A1 * 8/2008 Sekino ......................... 359/557
* cited by examiner

*Primary Examiner* — Rochelle-Ann J Blackman
(74) *Attorney, Agent, or Firm* — Raymond J. Chew

(57) ABSTRACT

A camera module includes a voice coil motor comprising a fixing assembly, a movable assembly, an elastic member connecting the movable assembly to the fixing assembly, and a pivoting member located between the fixing assembly and the movable assembly; a lens assembly and an image sensor received in the movable assembly; a plurality of Hall sensors capable of detecting movement distances of the movable assembly; and a control module comprising a current distributor, and a processor electrically connected to the Hall sensors. Wherein when shaking occurs, the housing is driven to move along the central axis and at the same time is rotated a desired angles pivoting on the pivoting member, the processor configured for calculating rotated angles of the movable assembly base on movement distances of the movable assembly relative to the respective Hall sensors.

9 Claims, 8 Drawing Sheets

CAMERA MODULE WITH ANTI-SHAKE MECHANISM

BACKGROUND

1. Technical Field

The present disclosure relates to camera modules, and particularly, to an anti-shake camera module.

2. Description of Related Art

Lens modules and image sensors are key components of camera modules. In normal use of a camera module, light rays coming from an object, transmit through the lens module along a predetermined path and fall on a central region of the image sensor. That is, an image plane of the object is precisely on the image sensor, and thus a clear image is obtained. However, inadvertent shaking of the camera module may occur during the time that an image is captured. When this happens, either or both of the lens module and the image sensor may move slightly relative to the object. In such case, the light rays from the object may not accurately fall on the image sensor. That is, the image plane of the object may not be precisely on the image sensor, resulting in a blurry image.

What is needed, therefore, is a camera module which can overcome the above shortcomings.

BRIEF DESCRIPTION OF THE DRAWINGS

Many aspects of the present camera module can be better understood with reference to the following drawings. The components in the drawings are not necessarily drawn to scale, the emphasis instead being placed upon clearly illustrating the principles of the present camera module. Moreover, in the drawings, like reference numerals designate corresponding parts throughout the several views.

DETAILED DESCRIPTION OF THE EMBODIMENTS

Embodiments of the present camera module will now be described in detail below and with reference to the drawings.

Figure 1:
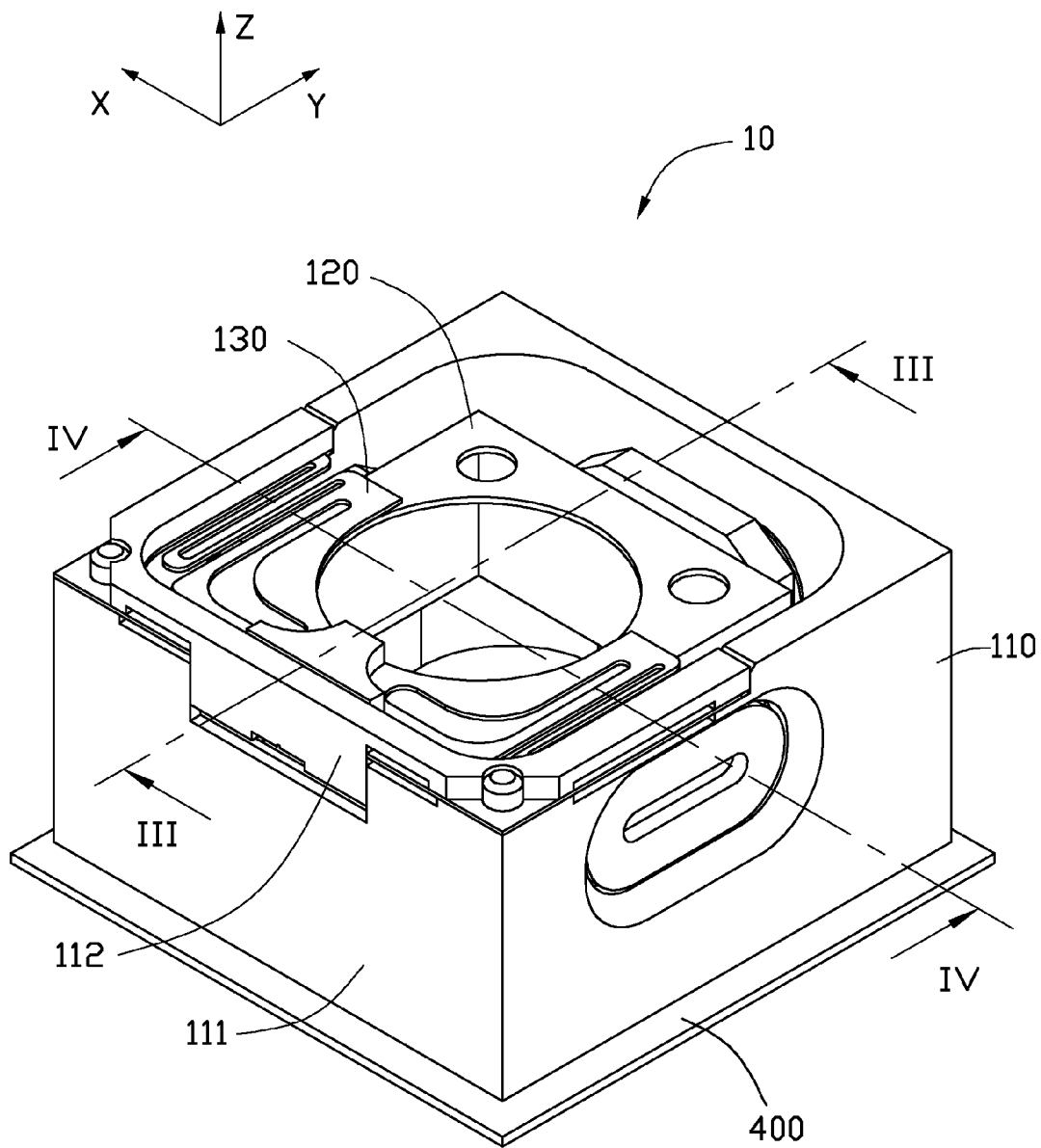
FIG. 1 is a schematic view of a camera module in accordance with an embodiment.
Figure 2:
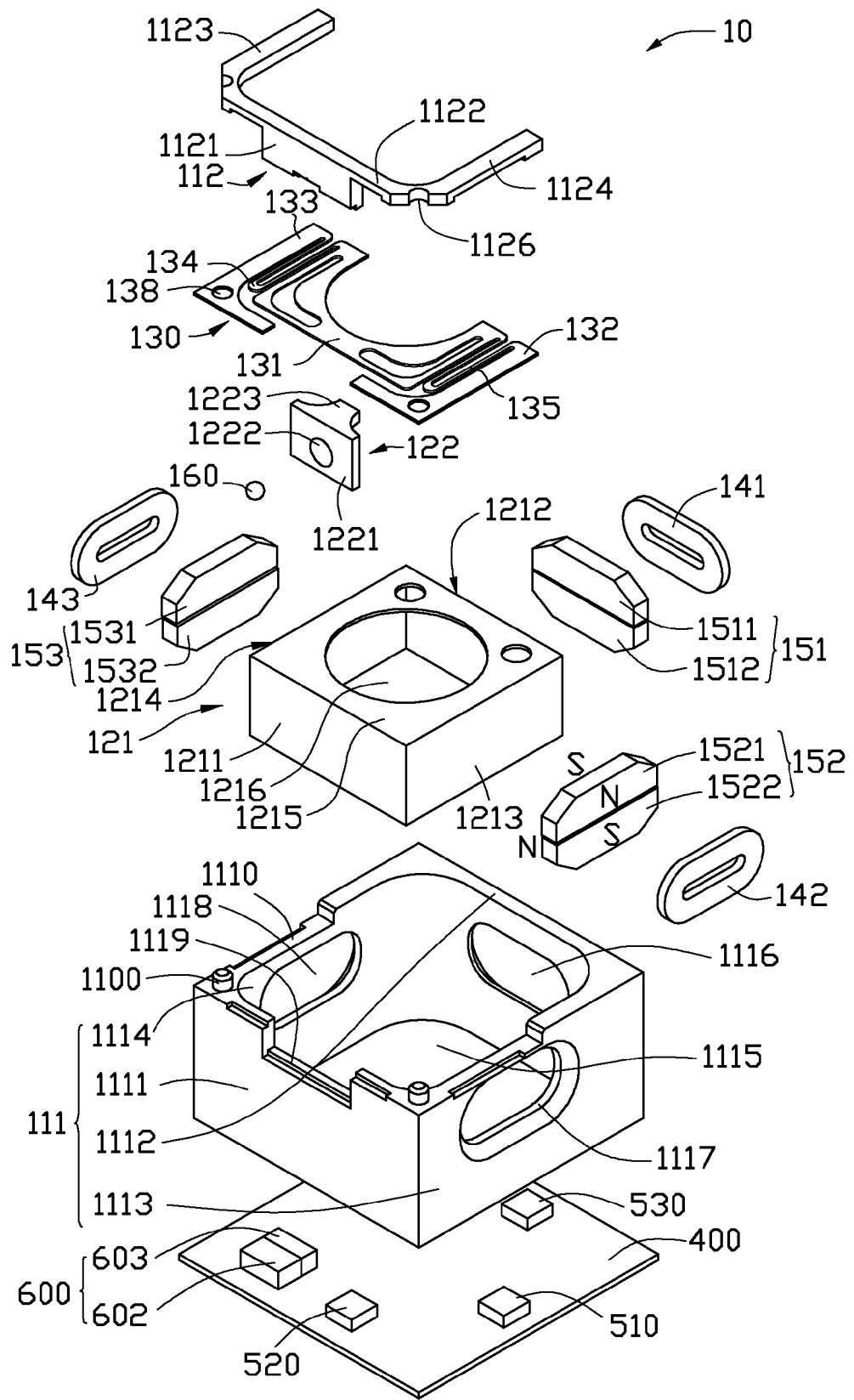
FIG. 2 is an exploded view of the camera module of FIG. 1.

Referring to FIGS. 1 and 2, an exemplary camera module 10, includes a voice coil motor 100, a lens assembly 200, an image sensor 300, a circuit board 400, a first Hall sensor 510, a second Hall sensor 520, a third Hall sensor 530 and a control module 600.

The voice coil motor 100 includes a fixing assembly 110, a movable assembly 120, an elastic member 130 connecting the movable assembly 120 to the fixing assembly 110, a first magnetic member 141, a second magnetic member 151, a third magnetic member 142, a fourth magnetic member 152, a fifth magnetic member 143, a sixth magnetic member 153, and a pivoting member 160 located between the fixing assembly 110 and the movable assembly 120.

The fixing assembly 110 includes a frame 111 and a fastening plate 112. The frame 111 has a quadrate configuration, and includes a first sidewall 1111, a second sidewall 1112 opposite to the first sidewall 1111, a third sidewall 1113, and a fourth sidewall 1114 opposite to the third sidewall 1113. A receiving space 1115 is defined in the frame 111, surrounded by the first, second, third and fourth sidewalls 1111, 1112, 1113, and 1114. A first opening 1116 is formed in the second sidewall 1112, a second opening 1117 is formed in the third sidewall 1113, and a third opening 1118 is formed in the fourth sidewall 1114. A first cutout 1119 is formed in the first sidewall 1111 at a top of the first sidewall 1111. Two second cutouts 1110 are formed in the third sidewall 1113 and the fourth sidewall 1114, respectively, and two protrusions 1100 are formed at the two corners of the first sidewall 1111.

The fastening plate 112 includes a first bar 1124, a second bar 1123, a third bar 1122 interconnecting the first bar 1124 and the second bar 1123, an extending portion 1121 and two recesses 1126. The first, second and third bars 1124, 1123, and 1122 cooperatively form a "U" configuration, and the two recesses 1125 are formed at the bottom of the "U" configuration. The extending portion 1121 extends downwards from a bottom of the third bar 1122, and the extending portion 1121 is substantially perpendicular to the "U" configuration. The first and second bars 1124 and 1123 are engaged with the second cutouts 1110, the recesses 1126 are engaged with the protrusions 1100, and the third bar 1122 together with the extending portion 1121 is engaged in the cutout 1119, thereby fastening the fastening plate 112 to the frame 111. A spherical recess 1125 is formed in a surface of the extending portion 1121, which faces the receiving space 1115 of the frame 111.

The movable assembly 120 includes a housing 121 and a connecting block 122. The housing 121 is received in the receiving space 1115 of the frame 111. The housing 121 includes a first sidewall 1211, an opposite second sidewall 1212, a third sidewall 1213, an opposite fourth sidewall 1214, and a cover 1215. A housing space 1216 is defined in the housing 121, and surrounded by the first, second, third and fourth sidewall 1211, 1212, 1213, 1214 and the cover 1215. The housing space 1216 receives the lens assembly 200 therein.

A cross sectional shape of the connecting block 122 is similar to "L". The connecting block 122 includes a first arm 1223 fixed to the cover 1215 of the housing 121, and a second arm 1221 fixed to the first sidewall 1211. The second arm 1221 faces the fastening plate 112 and is spaced apart from the fastening plate 112. A spherical recess 1222 is formed in the second arm 1221, and the spherical recess 1222 aligns with the spherical recess 1125 of the fastening plate 112. The pivoting member 160 is a ball bearing, and is received the spherical recesses 1222 and 1125.

The elastic member 130 includes a first portion 131, a second portion 132, a third portion 133, a first connecting portion 134 connecting the first portion 131 to the third portion 133, and a second connecting portion 135 connecting the first portion 131 to the second portion 132. Two through holes 138 are formed in the first and second portions 131 and 132, respectively. The first portion 131 is fixed to the cover 1215, the second portion 132 is sandwiched between the second bar 1123 of the fastening plate 112 and the fourth sidewall 1114 of the frame 111. The third portion 133 is sandwiched between the first bar 1124 of the fastening plate 112 and the third sidewall 1113 of the frame 111. The through holes 138 are engaged with the protrusions 1100 of the frame. The connecting block 122 may contact with the elastic member 130. The first and second connecting portions 134 and 135 are substantially "U" shaped. The openings of the "U" configuration of the first and second connecting portions 134 and 135 both face to the second sidewall 1112 of the frame 111. A gap is maintained between any adjacent two of the portions. The first and second connecting portions 134 and 135 provide elasticity for the first portion 131.

The first magnetic member 141, the third magnetic member 142, and the fifth magnetic member 143 are electromagnetic members, e.g., coils of wire. The first magnetic member 141 is retained in the first opening 1116, the third magnetic member 142 is retained in the second opening 1117, and the fifth magnetic member 143 is retained in the third opening 1118.

The second magnetic member 151 is fixed to the second sidewall 1212, the fourth magnetic member 152 is fixed to the third sidewall 1213, and the sixth magnetic member 153 is fixed to the fourth sidewall 1214. The second, fourth and sixth magnetic members 151, 152, and 153 each include a top permanent magnet 1511, 1521, and 1531 and a bottom permanent magnet 1512, 1522, and 1532, respectively. In the present embodiment, each of the top permanent magnets 1511, 1521, and 1531 has a single S polarity side adjacent to the housing 121, and a single N polarity side opposite to the S polarity side. Each of the bottom permanent magnet 1512, 1522, and 1532 has a single N polarity side adjacent to the housing 121, and a single S polarity side opposite to the N polarity side. Each of the top permanent magnet 1511, 1521, and 1531 and the bottom permanent magnet 1512, 1522, and 1532 can be made by a magnetization method. With the above configuration, when a current is applied to each of the first magnetic member 141, the third magnetic member 142 and the fifth magnetic member 143, the second magnetic member 151, the fourth magnetic member 152 and the sixth magnetic member 153 cooperatively are able to move along the Z axis as defined. That is, under the driving force given by all of the second magnetic members 151, the fourth magnetic member 152 and the sixth magnetic member 153, the housing 121 moves substantially along the Z axis.

The image sensor 300 is mounted at a bottom of the housing 121, facing the lens assembly 200. The circuit board 400 is mounted at a bottom of the frame 111, and has the first Hall sensor 510, second Hall sensor 520, third Hall sensor 530 and the control module 600 mounted thereon.

The first Hall sensor 510 aligns with the second magnetic member 151, the second Hall sensor 520 aligns with the fourth magnetic member 152, and the third Hall sensor 530 aligns with the sixth magnetic member 153. The first, second and third Hall sensors 510, 520, and 530 each work based on the Hall Effect. A voltage output by each of the first, second and third Hall sensors 510, 520, and 530 are determined by the intensity of the magnetic field applied thereon. That is, a distance between the first Hall sensor 510 and the second magnetic member 151 would influence the voltage output of the first Hall sensor 510. A distance between the second Hall sensor 520 and the fourth magnetic member 152 would influence the voltage output by the second Hall sensor 520, and a distance between the third Hall sensor 530 and the sixth magnetic member 153 would influence the voltage output by the third Hall sensor 530.

The control module 600 is configured to receive signals from the first, second and third Hall sensors 510, 520, and 530, and then supply currents to the first magnetic member 141, third magnetic member 142 and the fifth magnetic member 143. The control module 600 may include a current distributor 602 and a processor 603 therein. The current distributor 602 is electrically connected to the first magnetic member 141, third magnetic member 142 and the fifth magnetic member 143. The processor 603 is electrically connected to the first, second and third Hall sensors 510, 520, and 530.

Figure 3:
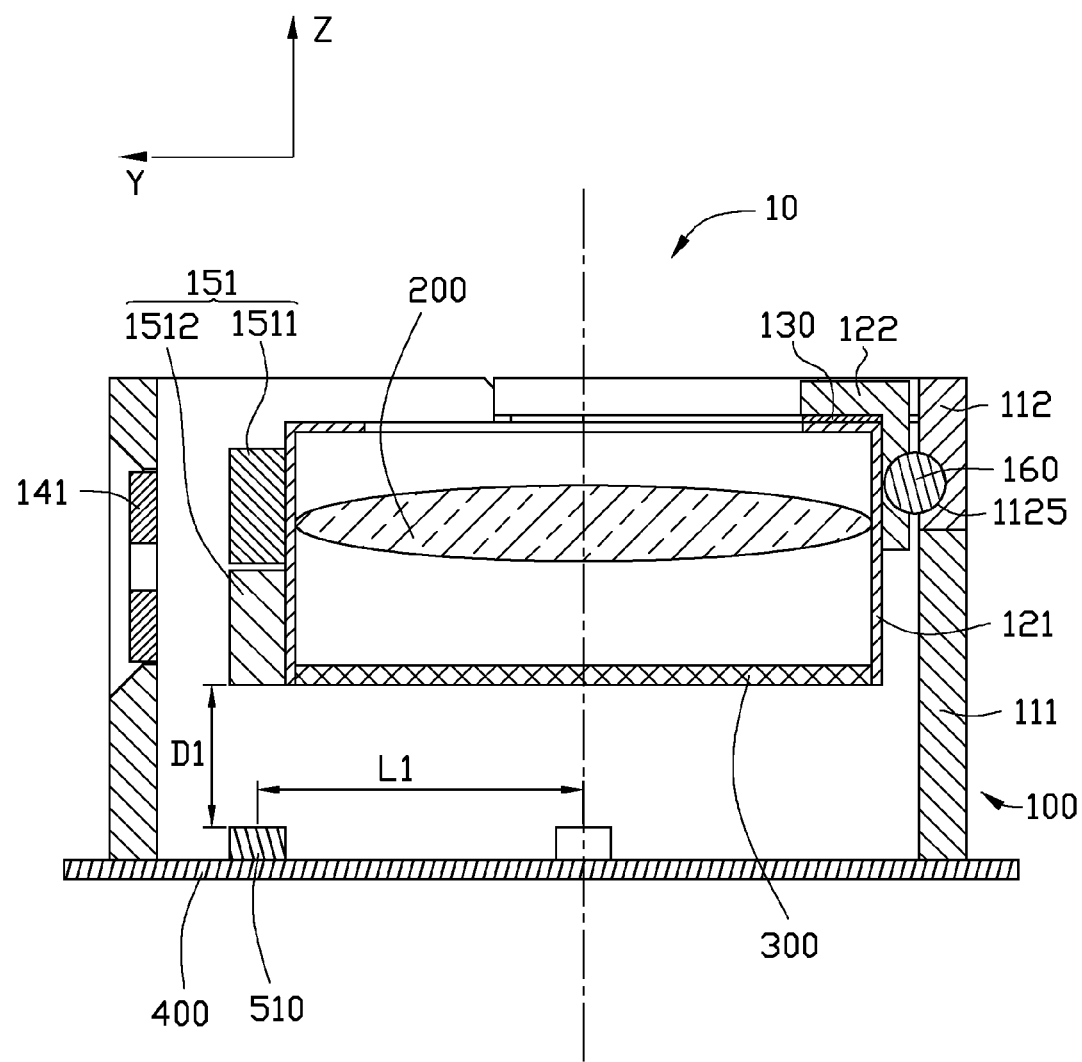
FIG. 3 is a cross-sectional view of the camera module of FIG. 1, taken along line
Figure 4:
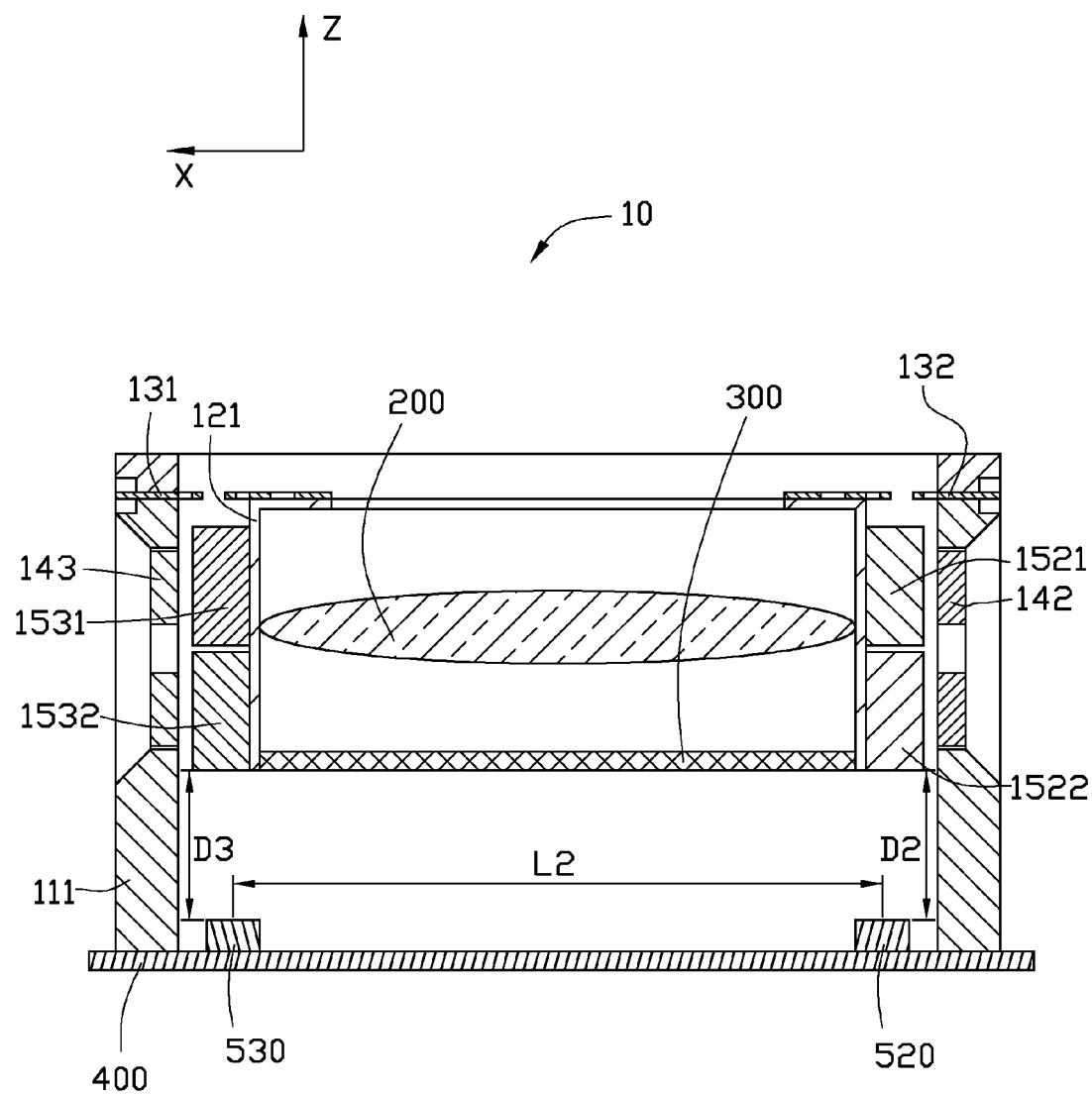
FIG. 4 is a cross-sectional view of the camera module of FIG. 1, taken along line IV-IV.

Referring also to FIGS. 3 and 4, a predetermined distance between the first Hall sensor 510 and the second magnetic member 151 is D1, a predetermined distance between the second Hall sensor 520 and the fourth magnetic member 152 is D2, and a predetermined distance between the third Hall sensor 530 and the sixth magnetic member 153 is D3. The Hall sensor 510 is spaced apart from a central axis of the fixing assembly 110 a distance L1, and the second Hall sensor 520 is spaced apart from the third Hall sensor 530 a distance L2.

Figure 5:
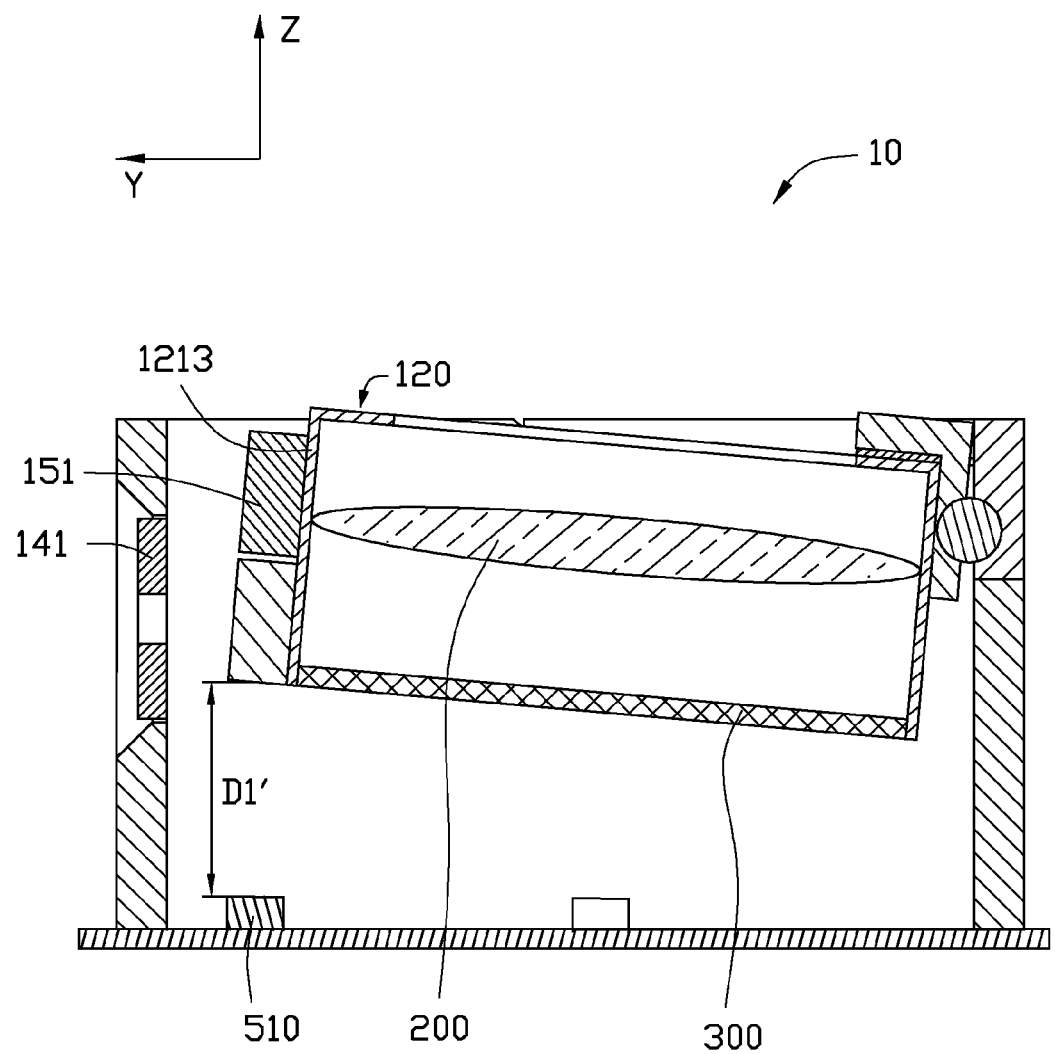
FIGS. 5 and 6 are similar to FIGS. 3 and 4, respectively, but each showing a movable assembly of the camera module could be rotated according to need.
Figure 6:
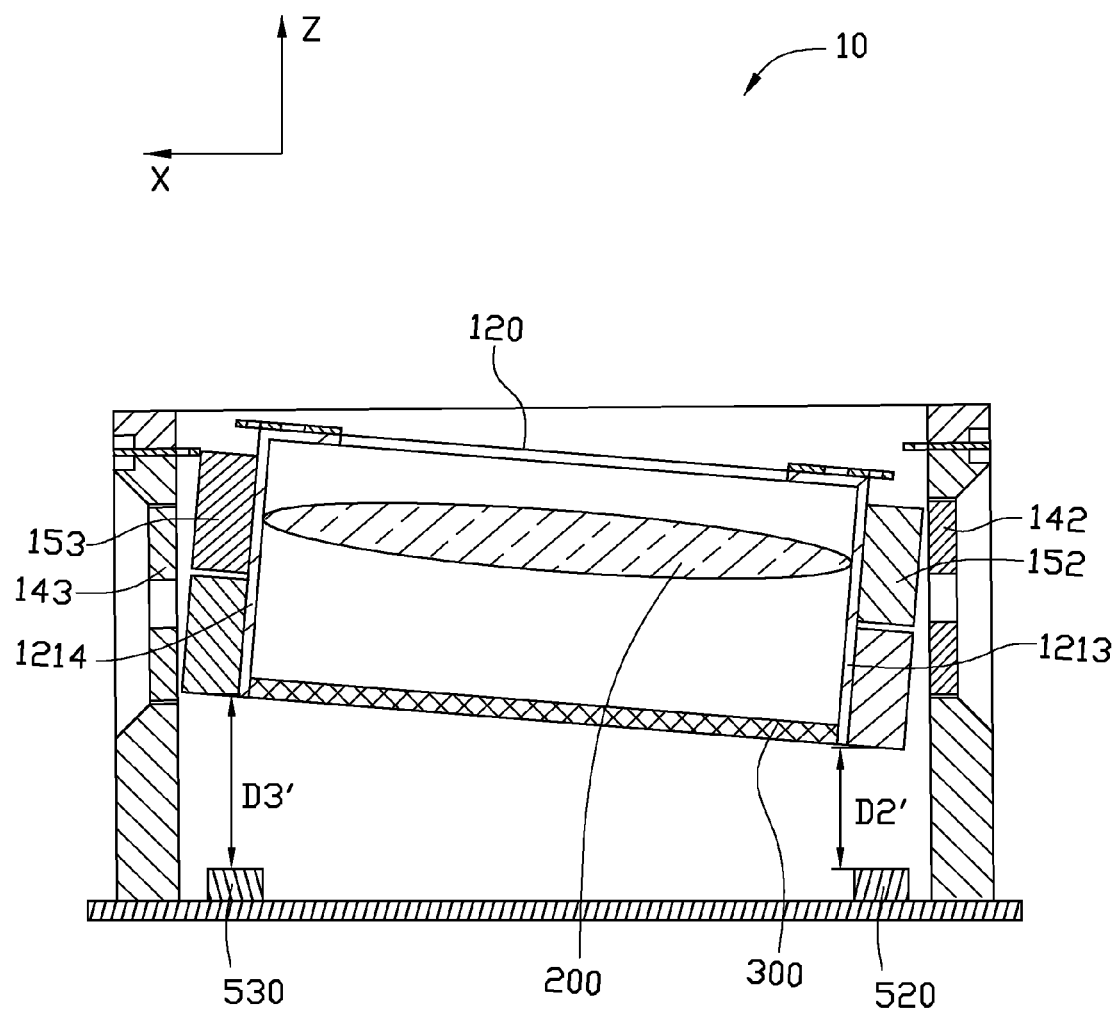

Referring also to FIGS. 5 and 6, when one of the second magnetic members 151, the fourth magnetic member 152 and the sixth magnetic member 153 is subject to a force substantially along a direction of the Z axis, i.e., the corresponding one of the first magnetic member 141, the third magnetic member 142 and the fifth magnetic member 143 has a current applied, due to the pivoting member 160, the housing 121 together with the lens assembly 200 may rotate certain angles about the Y axis or the X axis. The distance between the first Hall sensor 510 and the second magnetic member 151 may change to D1', the distance between the second Hall sensor 520 and the fourth magnetic member 152 may change to D2', and the distance between the third Hall sensor 530 and the sixth magnetic member 153 may change to D3'. A ratio between the L1 and a difference between the D1' and the D1 may substantially reflect the rotated angles about the X axis, and a ratio between the L2 and a difference between the D3' and the D2' may substantially reflect the rotated angles about the Y axis. The processor 603 is in charge of the ratio calculation. That is, the rotated angles of the housing 121 can be monitored.

It is understood that when two and not all of the second magnetic members 151, the fourth magnetic member 152 and the sixth magnetic member 153 are subject to a force substantially along a direction of the Z axis, due to the pivoting member 160, the housing 121 together with the lens assembly 200 may also rotate certain angles about the Y axis or the X axis.

Figure 7:
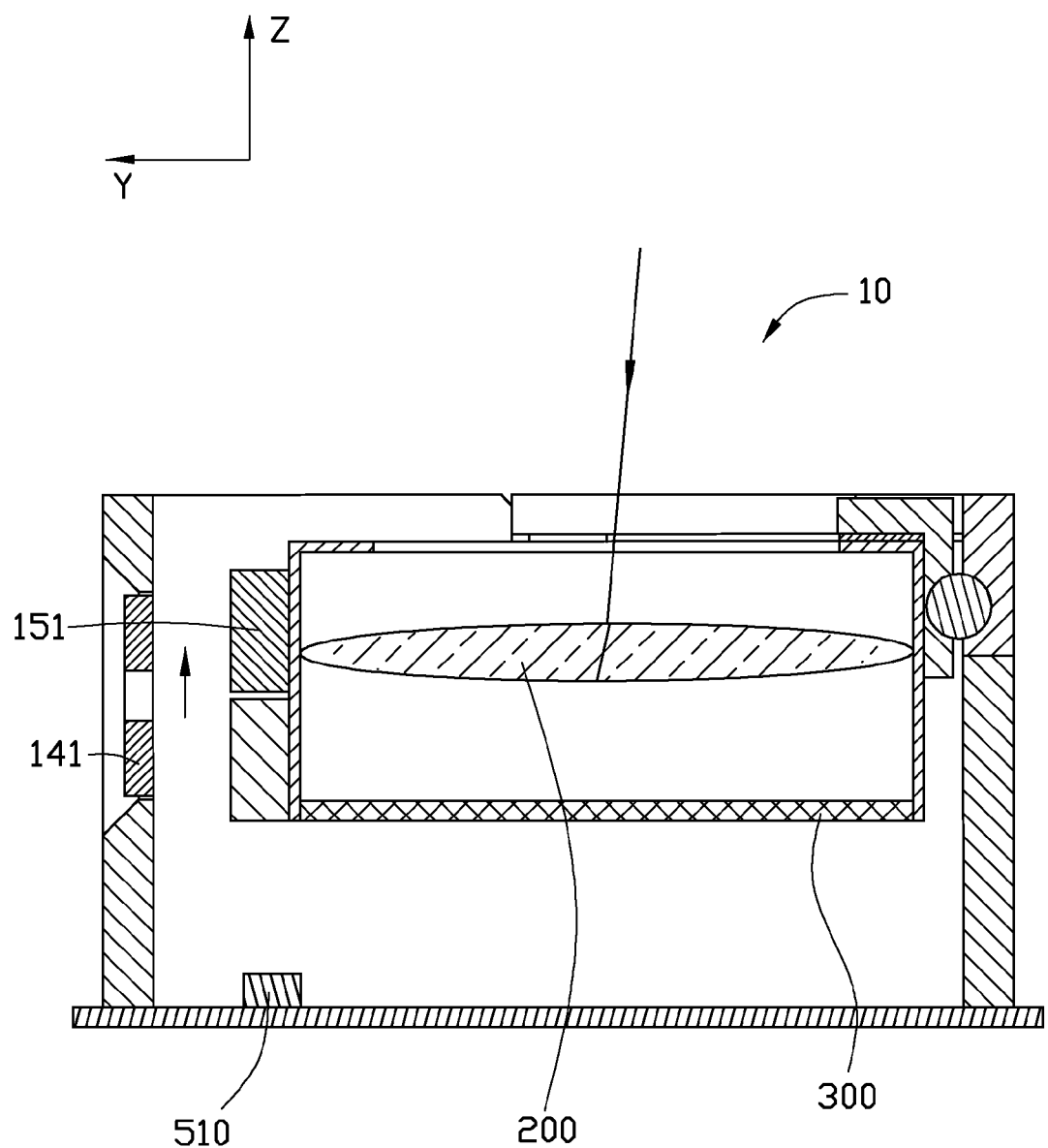
FIG. 7 is similar to FIG. 3, but showing that a deflection of light occurs when shaking of the camera module occurs.

Referring also to FIG. 7, in application, when a shaking of the entire camera module 10 occurs, the shaking may lead to rotations of the entire camera module 10 along the X axis and the Y axis, thus resulting a deflection of light when it passes through the lens assembly 200.

Figure 8:
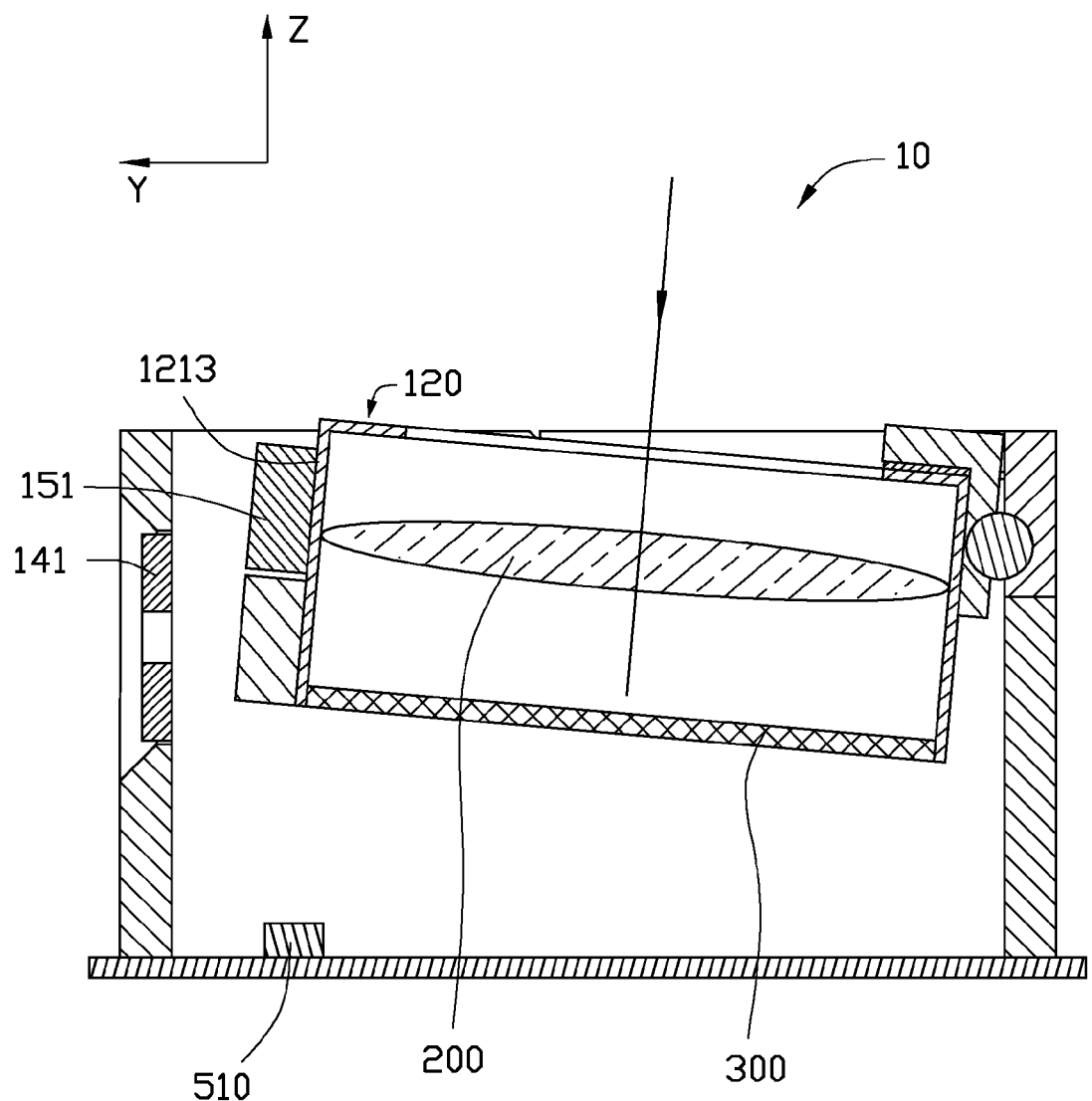
FIG. 8 shows the movable assembly of the camera module is rotated to anti-shake.

To work in the anti-shake function, for example, assuming that the rotations result in rotating the housing 121 along with the lens assembly 200 and the image sensor 300, to move upwards along the Z axis. The current distributor 602 of the control module 600 distributes a current to the corresponding first magnetic member 141, the third magnetic member 142, and the fifth magnetic member 143 to move the housing 121 downwards along the Z axis. That is, it rotates the movable assembly 120 to the desired angles, then the light will not deflect when it passes through the lens assembly 200 (see FIG. 8). That is, the camera module 10 has the anti-shake function.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A camera module comprising:
  a voice coil motor comprising a fixing assembly, a movable assembly, an elastic member connecting the movable assembly to the fixing assembly, and a pivoting member mounted between the fixing assembly and the movable assembly, the fixing assembly comprising a frame and a plurality of first magnetic members mounted on the respective inner sides thereof, the movable assembly comprising a housing received in the frame and a plurality of second magnetic members mounted on the respective outer sides thereof, the first magnetic members and the second magnetic members being configured for driving the housing to move along a central axis thereof, the elastic member comprising a first portion fixed to the housing, a second portion and a third portion both fixed to the frame, a first connecting portion and a second connecting portion connecting the first portion to the second portion and connecting the first portion to the third portion, respectively, and a gap maintained between any adjacent two of the first, second and third portions;

a lens assembly and an image sensor received in the housing;

a plurality of Hall sensors located within the frame and substantially aligning with the respective second magnetic members, the Hall sensors being capable of detecting movement distances of the second magnetic members relative to the respective Hall sensors according to changes of intensity of magnetic fields generated by the respective second magnetic members; and a control module comprising a current distributor electrically connected to the first magnetic members, and a processor electrically connected to the Hall sensors, the current distributor configured to provide a current to one of the first magnetic members to drive the housing to move along the central axis and rotate an angle relative to the pivoting member, the processor configured for calculating the rotation angle of the housing based on movement distances of the second magnetic members relative to the respective Hall sensors.

2. The camera module as described in claim 1, wherein the fixing assembly further comprises a fastening plate fastening the second portion and the third portion to the frame.

3. The camera module as described in claim 2, wherein the fastening plate comprises a first bar, a second bar, a third bar interconnecting the first bar and the second bar, and an extending portion extending downwards from a bottom of the third bar, three cutouts are formed in three sides of the frame, and the first bar, the second bar, and the third bar together with the extending portion are engaged in the three cutouts.

4. The camera module as described in claim 3, wherein the movable assembly further comprises a connecting portion fixed on the housing and facing the fastening plate, each of the connecting portion and the fastening plate has a spherical recess formed therein, and the pivoting member is received in the spherical recesses.

5. The camera module as described in claim 1, wherein each of the first magnetic members is a coil of wire, each of the second magnetic members comprises a top permanent magnet and a bottom permanent magnet, each of the top permanent magnets comprises one of single N magnetic polarity and single S magnetic polarity facing the corresponding one of the first magnetic members, and each of the bottom permanent magnets comprises the other of single N magnetic polarity and single S magnetic polarity facing the same one of the first magnetic members.

6. The camera module as described in claim 1, further comprising a circuit board mounted on a bottom of the frame, wherein the Hall sensors and the control module are mounted on the circuit board.

7. A camera module comprising:
a voice coil motor comprising a fixing assembly, a movable assembly, and an elastic member connecting the movable assembly to the fixing assembly, the fixing assembly comprising a cuboid frame and three electromagnets mounted on three inner lateral sides thereof, the movable assembly comprising a housing received in the frame and three permanent magnets mounted on three outer lateral sides thereof, the electromagnets and the permanent magnets being configured for driving the housing to move along a central axis thereof;

a lens assembly and an image sensor received in the housing;

three Hall sensors located within the frame and substantially aligning with the respective permanent magnets, the Hall sensors being capable of detecting movement distances of the permanent magnets relative to the respective Hall sensors according to changes of intensity of magnetic fields generated by the respective permanent magnets, and outputting voltage signals;

a pivoting member mounted between the fixing assembly and the movable assembly; and a control module comprising a current distributor electrically connected to the electromagnets, and a processor electrically connected to the Hall sensors, the current distributor configured for providing a current to one of the electromagnets to drive the housing to move along the central axis and rotate an angle relative to the pivoting member, the processor configured for calculating the rotation angle of the housing based on voltage signals from the Hall sensors.

8. The camera module as described in claim 7, wherein the fixing assembly further comprises a fastening plate including a first bar, a second bar, a third bar interconnecting the first bar and the second bar, and an extending portion extending downwards from a bottom of the third bar, three cutouts are formed in three sides of the frame, and the first bar, the second bar, and the third bar together with the extending portion are engaged in the three cutouts.

9. The camera module as described in claim 8, wherein the movable assembly further comprises a connecting portion fixed on the housing and facing the fastening plate, each of the connecting portion and the fastening plate has a spherical recess formed therein, and the pivoting member is received in the spherical recesses.

* * * * *